(12) United States Patent
Wu (10) Patent No.: US 12,015,963 B2
(45) Date of Patent: Jun. 18, 2024

(54) METHOD AND APPARATUS FOR PUSHING INFORMATION, DEVICE AND STORAGE MEDIUM

(71) Applicant: Apollo Intelligent Connectivity (Beijing) Technology Co., Ltd., Beijing (CN)

(72) Inventor: Junfa Wu, Beijing (CN)

(73) Assignee: APOLLO INTELLIGENT CONNECTIVITY (BEIJING) TECHNOLOGY CO., LTD., Beijing (CN)

( * ) Notice: Subject to any disclaimer, the term of this patent is extended or adjusted under 35 U.S.C. 154(b) by 190 days.

(21) Appl. No.: 17/701,469

(22) Filed: Mar. 22, 2022

(65) Prior Publication Data

US 2022/0217494 A1    Jul. 7, 2022

(30) Foreign Application Priority Data

May 31, 2021    (CN) .......................... 202110599713.4

(51) Int. Cl.
| | |
|---|---|
| *H04W 4/021* | (2018.01) |
| *G01C 21/34* | (2006.01) |
| *G01C 21/36* | (2006.01) |
| *G02B 27/01* | (2006.01) |
| *H04W 4/02* | (2018.01) |
| *H04W 4/44* | (2018.01) |
| *B60K 35/00* | (2006.01) |
| *B60K 35/23* | (2024.01) |
| *B60K 35/28* | (2024.01) |
| *B60K 35/29* | (2024.01) |

(52) U.S. Cl.
CPC ........ *H04W 4/021* (2013.01); *G01C 21/3476* (2013.01); *G01C 21/365* (2013.01); *G02B 27/0101* (2013.01); *H04W 4/023* (2013.01); *H04W 4/44* (2018.02); *B60K 35/00* (2013.01); *B60K 35/23* (2024.01); *B60K 35/28* (2024.01); *B60K 35/29* (2024.01); *B60K 2360/166* (2024.01); *B60K 2360/184* (2024.01); *G02B 2027/014* (2013.01); *G02B 2027/0141* (2013.01)

(58) Field of Classification Search
CPC .............. G01C 21/3476; G01C 21/365; G02B 27/0101; H04W 4/021; H04W 4/44
See application file for complete search history.

(56) References Cited

U.S. PATENT DOCUMENTS

| | | |
|---|---|---|
| 9,581,457 B1 | 2/2017 | Meredith et al. |
| 10,190,884 B2 | 1/2019 | Nakanishi et al. |

(Continued)

FOREIGN PATENT DOCUMENTS

| | | |
|---|---|---|
| CN | 105513389 A | 4/2016 |
| CN | 106092121 A | 11/2016 |

(Continued)

*Primary Examiner* — Seth A Silverman
(74) *Attorney, Agent, or Firm* — Seed IP Law Group LLP (57) ABSTRACT

The present disclosure provides a method and apparatus for pushing information, a device and a storage medium, and relates to the field of autonomous driving. An implementation is: acquiring a current location of a vehicle; determining, based on the current location and a position of each POI in a preset set of POIs, a target POI from the set of POIs; and pushing relevant information of the target POI to a head up display of the vehicle.

17 Claims, 4 Drawing Sheets

(56) References Cited

U.S. PATENT DOCUMENTS

| | | | |
|---|---|---|---|
| 2004/0260465 A1* | 12/2004 | Tu | G01C 21/34 |
| | | | 701/426 |
| 2009/0319178 A1 | 12/2009 | Khosravy et al. | |
| 2016/0131497 A1* | 5/2016 | Choi | G01C 21/3476 |
| | | | 701/411 |
| 2018/0348000 A1* | 12/2018 | Cai | G01C 21/367 |
| 2020/0012680 A1* | 1/2020 | Nomura | G06F 16/5846 |
| 2020/0049835 A1* | 2/2020 | Browning | G01S 19/48 |
| 2020/0120440 A1* | 4/2020 | Lisewski | H04W 4/02 |
| 2021/0181834 A1* | 6/2021 | Yamamoto | G06F 3/011 |

FOREIGN PATENT DOCUMENTS

| | | | |
|---|---|---|---|
| CN | 109101613 A | 12/2018 |
| CN | 111954875 A | 11/2020 |
| JP | 2010-66042 A | 3/2010 |
| JP | 2017-166980 A | 9/2017 |
| JP | 2017-223666 A | 12/2017 |
| JP | 2019-504316 A | 2/2019 |
| JP | 2020-118507 A | 8/2020 |
| JP | 2020-530099 A | 10/2020 |
| WO | 2015/174050 A1 | 11/2015 |
| WO | 2020/142112 A1 | 7/2020 |

* cited by examiner

METHOD AND APPARATUS FOR PUSHING INFORMATION, DEVICE AND STORAGE MEDIUM

CROSS-REFERENCE TO RELATED APPLICATIONS

This application claims priority to Chinese Patent Application No. 202110599713.4, filed with the China National Intellectual Property Administration (CNIPA) on May 31, 2021, the content of which is incorporated herein by reference in its entirety.

TECHNICAL FIELD

The present disclosure relates to the field of computer technology, in particular to the field of autonomous driving, and more particular to a method and apparatus for pushing information, a device, and a storage medium.

BACKGROUND

AR-HUD accurately combines image information with actual traffic conditions using an internal specially designed optical system, and projects information such as tire pressure, speed, and rotational speed onto a front windshield. This enables vehicle owners to view vehicle-related information without having to lower their heads while driving. The emergence of the AR-HUD may also enrich the display of POIs.

SUMMARY

A method and apparatus for pushing information, a device, and a storage medium are provided.

In a first aspect, some embodiments of the present disclosure provide a method for pushing information. The method includes: acquiring a current location of a vehicle; determining, based on the current location of the vehicle and a position of each point of interest (POI) in a preset set of points of interest (POIs), a target POI from the set of POIs; and pushing relevant information of the target POI to a head up display of the vehicle.

In a second aspect, some embodiments of the present disclosure provide an apparatus for pushing information. The apparatus includes: a location acquisition unit, configured to acquire a current location of a vehicle; a POI determination unit, configured to determine, based on the current location of the vehicle and a position of each point of interest (POI) in a preset set of points of interest (POIs), a target POI from the set of POIs; and a POI pushing unit, configured to push relevant information of the target POI to a head up display of the vehicle.

In a third aspect, some embodiments of the present disclosure provide an electronic device. The electronic device includes: at least one processor; and a memory, communicatively connected to the at least one processor; where the memory, storing instructions executable by the at least one processor, the instructions, when executed by the at least one processor, cause the at least one processor to perform the method according to the first aspect.

In a fourth aspect, some embodiments of the present disclosure provide a non-transitory computer readable storage medium, storing computer instructions, the computer instructions, when executed by a processor, cause the processor to perform the method according to the first aspect.

In a fifth aspect, some embodiments of the present disclosure provide a computer program product, comprising a computer program, the computer program, when executed by a processor, cause the processor to implement the method according to the first aspect.

It should be understood that the content described in this section is not intended to identify key or important features of the embodiments of the present disclosure, nor to limit the scope of the present disclosure. Other features of the present disclosure will be easily understood through the following description.

BRIEF DESCRIPTION OF THE DRAWINGS

The accompanying drawings are used to better understand the present solution, and do not constitute a limitation to the present disclosure, in which.

DETAILED DESCRIPTION OF EMBODIMENTS

The following describes exemplary embodiments of the present disclosure in conjunction with the accompanying drawings, which includes various details of the embodiments of the present disclosure to facilitate understanding, and they should be considered as merely exemplary. Therefore, those of ordinary skill in the art should recognize that various changes and modifications can be made to embodiments described herein without departing from the scope and spirit of the present disclosure. Also, for clarity and conciseness, descriptions of well-known functions and structures are omitted in the following description.

It should be noted that embodiments in the present disclosure and the features in the embodiments may be combined with each other on a non-conflict basis. Embodiments of the present disclosure will be described below in detail with reference to the accompanying drawings.

Figure 1:
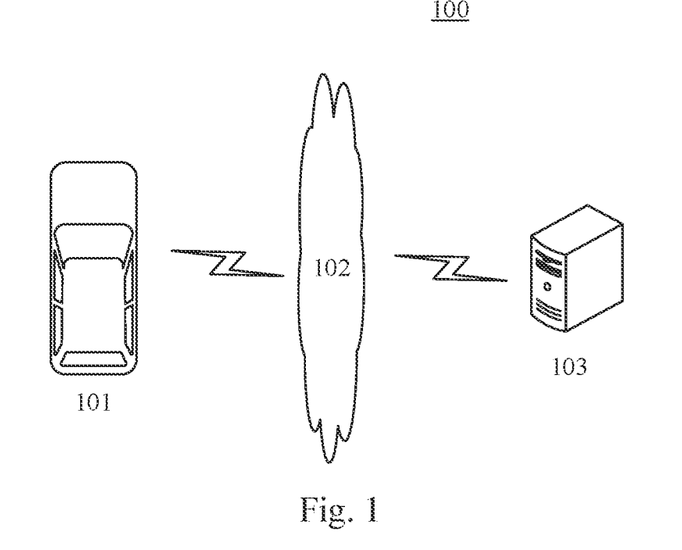
FIG. 1 is an exemplary system architecture diagram in which an embodiment of the present disclosure may be implemented.

FIG. 1 illustrates an exemplary system architecture 100 of a method for pushing information or an apparatus for pushing information in which embodiments of the present disclosure may be implemented.

As shown in FIG. 1, the system architecture 100 may include a vehicle 101, a network 102 and a server 103. The network 102 is used to provide a communication link medium between the vehicle 101 and the server 103. The network 102 may include various types of connections, such as wired, wireless communication links, or optic fibers.

A head up display system may be installed on the vehicle 101, and other sensors for assisting driving may also be installed. The vehicle 101 may receive information sent from the server 103 and display the information on the head up display system and/or a central control display.

The server 103 may be a server that provides various services, for example, a backend server that pushes a POI to the vehicle 101. The backend server may determine the POI based on a location of the vehicle, and feed back relevant information of the POI to the vehicle 101.

It should be noted that the server 103 may be hardware or software. When the server 103 is hardware, it may be implemented as a distributed server cluster composed of a plurality of servers, or as a single server. When the server 103 is software, it may be implemented as a plurality of software or software modules (for example, for providing distributed services) or as a single software or software module, which is not limited herein.

It should be noted that the method for pushing information provided by embodiments of the present disclosure is generally performed by a vehicle-mounted terminal of the vehicle 101. Correspondingly, the apparatus for pushing information is generally provided in the vehicle-mounted terminal of the vehicle 101.

It should be understood that the numbers of vehicles, networks, and servers in FIG. 1 are merely illustrative. Depending on the implementation needs, there may be any number of vehicles, networks, and servers.

Figure 2:
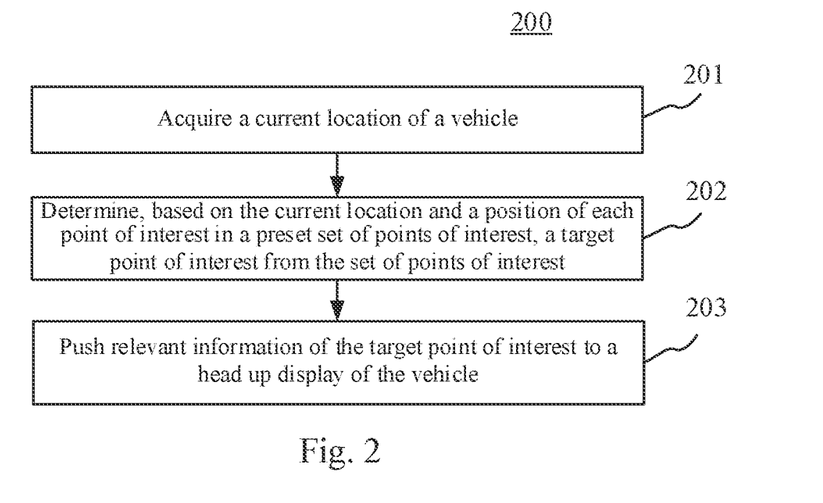
FIG. 2 is a flowchart of a method for pushing information according to an embodiment of the present disclosure.

With further reference to FIG. 2, a flow 200 of a method for pushing information according to an embodiment of the present disclosure is illustrated. The method for pushing information includes the following steps:

Step 201, acquiring a current location of a vehicle.

In the present embodiment, an executing body may acquire the current location of the vehicle. The current location of the vehicle may be determined by a positioning apparatus (for example, a GPS positioning apparatus, a Beidou positioning apparatus) installed in the vehicle. The above acquired location may be GPS coordinates or an address (such as No. XX, XX Street, District B, City A).

Step 202, determining, based on the current location of the vehicle and a position of each point of interest (POI) in a preset set of points of interest (POIs), a target POI from the set of POIs.

In the present embodiment, the executing body may acquire the set of POIs in advance. The set of POIs may be acquired from a map server, and the map server may store relevant information of respective POIs, for example, the relevant information may include images, videos, addresses, telephone numbers, etc. of the POIs. The executing body may determine the target POI from the set of POIs based on the current location of the vehicle and the position of each POI. For example, the executing body may use a POI closest to the current location of the vehicle as the target POI, or may use a POI having a distance from the current location less than a preset value and most relevant to a current scenario as the target POI. For example, if the current time is 12 o'clock noon, the executing body may use the most visited restaurant within 2 Km from the current location of the vehicle as the target POI. Or, if the vehicle has traveled 300 km since the last time it was refueled, the executing body may use a gas station within 10 Km from the current location of the vehicle as the target POI.

Step 203, pushing relevant information of the target POI to a head up display of the vehicle.

In the present embodiment, after determining the target POI, the executing body may push the relevant information of the target POI to the head up display of the vehicle. In this way, a user may browse the relevant information of the target POI without lowering his head. The relevant information may include a image/picture, a promotional video, a telephone number, a specific location, etc. of the target POI.

In some practices, the relevant information may also include a distance from the target POI to the vehicle. The head up display may convey the relevant information of the target POI to the user in a variety of methods, for example, in the form of voice broadcast, or in the form of highlighting a certain position on the head up display, and so on.

Figure 3:
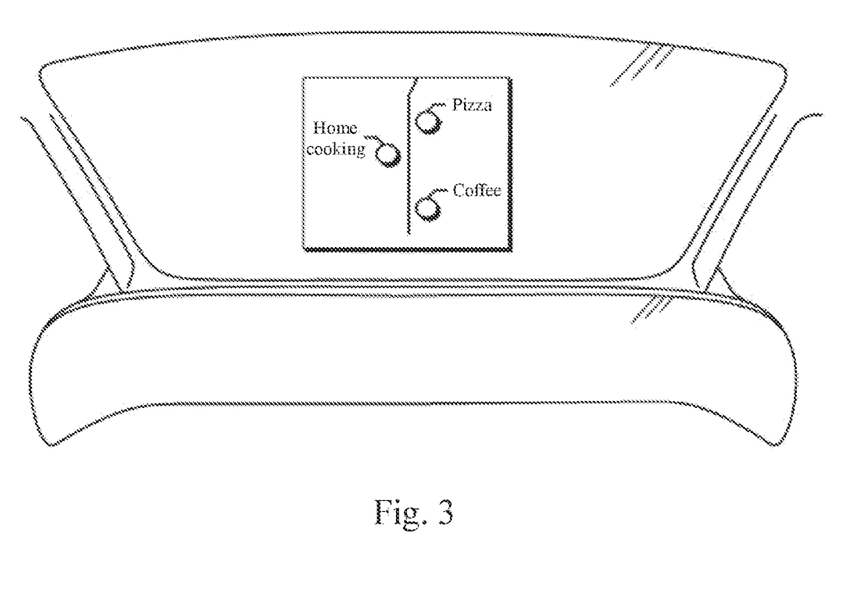
FIG. 3 is a schematic diagram of an application scenario of the method for pushing information according to an embodiment of the present disclosure.

With further reference to FIG. 3, a schematic diagram of an application scenario of the method for pushing information according to an embodiment of the present disclosure is illustrated. In the application scenario of FIG. 3, the vehicle uses a positioning apparatus installed on the vehicle to determine a vehicle location in real time while the vehicle is traveling. A vehicle-mounted computer determines a target POI around the traveling path in time. An image and a video of the target POI are pushed to a head up display, so that the user may view relevant information of the target POI without lowering his head.

The method for pushing information provided by the above embodiments of the present disclosure displays the relevant information of a POI on the HUD (head up display), thereby enriching the display of POIs, which improves user perception and at the same time can increase a click rate of POIs.

Figure 4:
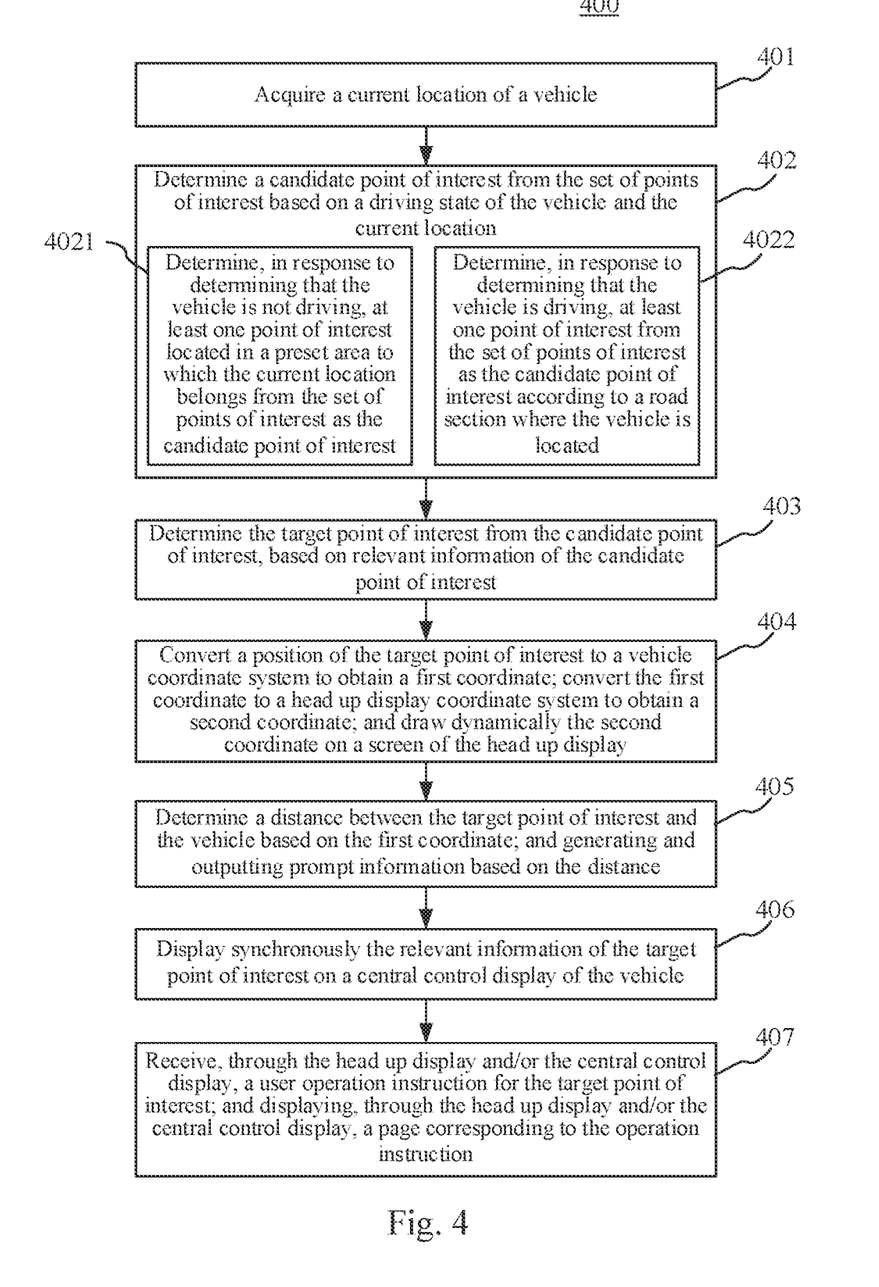
FIG. 4 is a flowchart of a method for pushing information according to another embodiment of the present disclosure.

With further reference to FIG. 4, a flow 400 of a method for pushing information according to another embodiment of the present disclosure is illustrated. As shown in FIG. 4, the method of the present embodiment may include the following steps:

Step 401, acquiring a current location of a vehicle.

Step 402, determining a candidate POI from the set of POIs based on a traveling state of the vehicle and the current location.

In the present embodiment, the executing body may determine the candidate POI(s) from the set of POIs based on the traveling state of the vehicle and the current location of the vehicle. The traveling state of the vehicle may include travelling and not traveling. If the vehicle is traveling, the executing body may use a POI within a preset distance along the traveling direction in front of the current location of the vehicle as a candidate POI. If the vehicle is not traveling, the executing body may use a POI in a preset range around the vehicle as a candidate POI.

In some alternative implementations of the present embodiment, the executing body may determine the candidate POI(s) through steps 4021 and 4022:

Step 4021, determining, in response to determining that the vehicle is not traveling, at least one POI located in a preset area from the set of POIs as the candidate POI, the current location of the vehicle being within the preset area.

In this implementation, if the vehicle is not traveling, that is, in a stop state, the executing body may first determine the preset area to which the current location belongs. The preset area may be a circle with the current location as the center and a radius of 500 m. The executing body may use the at least one POI located in the preset area from the set of POIs as the candidate POI(s).

Step 4022, determining, in response to determining that the vehicle is traveling, at least one POI from the set of POIs as the candidate POI according to a road section where the vehicle is located.

In this implementation, if the vehicle is traveling, the executing body may first determine the road section where the vehicle is located. If the vehicle is currently using the navigation function, the road section where the vehicle is located and a road section to be traveled by the vehicle may be determined according to the navigated route. If the vehicle is not currently using the navigation function, the executing body may determine the road section where the vehicle is located based on the location of the vehicle and road network data. Then, the executing body may determine at least one POI around the above road section, and use the at least one POI as the candidate POI(s).

Step 403, determining the target POI from the candidate POI(s), based on relevant information of the candidate POI(s).

After determining the candidate POI(s), the executing body may acquire the relevant information of the candidate POI(s). Then, based on the acquired relevant information, the target POI may be determined from the candidate POI(s). The executing body may use various sorting strategies to sort the candidate POI(s), and use a POI in a top N positions as the target POI.

Step 404, converting a position of the target POI to a vehicle coordinate system, to obtain a first coordinate; converting the first coordinate to a head up display coordinate system, to obtain a second coordinate; and drawing dynamically the second coordinate on a screen of the head up display.

After determining the target POI, the executing body may convert the position of the target POI to the vehicle coordinate system. Generally speaking, the position of the target POI is relative to the geodetic coordinate system. The executing body may convert the position of the target POI to the vehicle coordinate system according to a conversion matrix between the vehicle coordinate system and the geodetic coordinate system, to obtain the first coordinate. Then, the executing body may convert the first coordinate to the head up display coordinate system according to a conversion matrix between the vehicle coordinate system and the head up display coordinate system, to obtain the second coordinate. Then, the executing body may dynamically draw the second coordinate on the screen of the head up display. In this way, the target POI may be dynamically and accurately displayed on the head up display.

Step 405, determining a distance between the target POI and the vehicle based on the first coordinate; and generating and outputting prompt information based on the distance.

After obtaining the first coordinate, the executing body may determine the distance between the target POI and the vehicle based on the first coordinate. The executing body may use the location of the vehicle as an origin of the vehicle coordinate system. The executing body may calculate a distance between the first coordinate and the origin of the vehicle coordinate system. After obtaining the above distance, the executing body may generate prompt information. The prompt information may be "XX is found in XX meters ahead, whether to drive there or not". The executing body may output the prompt information in a variety of methods, for example, it may broadcast the prompt information in language, or output the prompt information in the form of a pop-up prompt box.

Step 406, displaying synchronously the relevant information of the target POI on a central control display of the vehicle.

In the present embodiment, the executing body may also display synchronously the relevant information of the target POI on the central control display of the vehicle. In this way, the user may operate on the target POI through the head up display, and may also operate on the target POI through the central control display, thereby realizing multi-screen interaction.

Step 407, receiving, through the head up display and/or the central control display, a user operation instruction targeted at the target POI; and displaying, through the head up display and/or the central control display, a page corresponding to the operation instruction.

In the present embodiment, the executing body may receive the user operation instruction targeted at the target POI through the head up display and/or the central control display. The operation instruction may be generated by clicking a button, or the operation instruction may be an action instruction. An image acquisition apparatus may be installed in the vehicle, and the executing body may recognize a user action from an image sequence acquired by the image acquisition apparatus, so as to further determine the user operation instruction. After determining the operation instruction, the executing body may display the page corresponding to the operation instruction through the head up display and/or the central control display. The corresponding relationship between the operation instruction and the page may be: swipe left to display more, swipe right to exit, and slide down to navigate to the POI.

The method for pushing information provided by the above embodiment of the present disclosure may complete the selection of a POI in an intelligent interactive approach, thereby improving the triggering probability of commercial scenarios and increasing the clicking probability of POIs.

Figure 5:
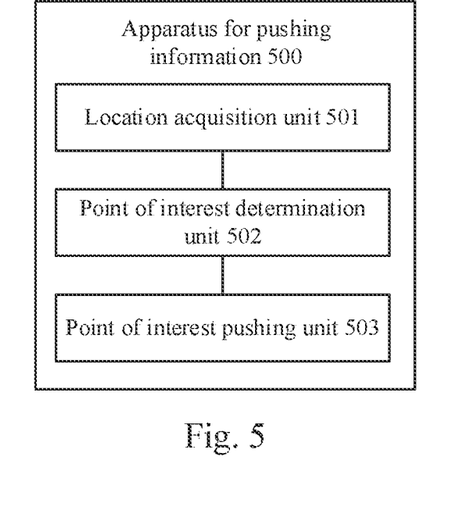
FIG. 5 is a schematic structural diagram of an apparatus for pushing information according to an embodiment of the present disclosure.

With further reference to FIG. 5, as an implementation of the method shown in the above figures, an embodiment of the present disclosure provides an apparatus for pushing information, and the apparatus embodiment corresponds to the method embodiment as shown in FIG. 2, and the apparatus may be applied to various electronic devices.

As shown in FIG. 5, the apparatus 500 for pushing information of the present embodiment includes: a location acquisition unit 501, a POI determination unit 502 and a POI pushing unit 503.

The location acquisition unit 501 is configured to acquire a current location of a vehicle.

The POI determination unit 502 is configured to determine, based on the current location of the vehicle and a position of each POI in a preset set of POIs, a target POI from the set of POIs.

The POI pushing unit 503 is configured to push relevant information of the target POI to a head up display of the vehicle.

In some alternative implementations of the present embodiment, the POI pushing unit 503 may be further configured to: convert a position of the target POI to a vehicle coordinate system, to obtain a first coordinate; convert the first coordinate to a head up display coordinate system, to obtain a second coordinate; and draw dynamically the second coordinate on a screen of the head up display.

In some alternative implementations of the present embodiment, the apparatus 500 may further include a prompt unit not shown in FIG. 5, configured to: determine, based on the first coordinate, a distance between the target POI and the vehicle; and generate and output prompt information based on the distance.

In some alternative implementations of the present embodiment, the POI determination unit 502 may be further configured to: determine a candidate POI from the set of POIs based on a traveling state of the vehicle and the current location of the vehicle; and determine the target POI from the candidate POI, based on relevant information of the candidate POI.

In some alternative implementations of the present embodiment, the POI determination unit 502 may be further configured to: in response to determining that the vehicle is not traveling, determine at least one POI located in a preset area from the set of POIs as the candidate POI, the current location of the vehicle being within the preset area.

In some alternative implementations of the present embodiment, the POI determination unit 502 may be further configured to: in response to determining that the vehicle is traveling, determine at least one POI from the set of POIs as the candidate POI according to a road section, the vehicle being located on the road section.

In some alternative implementations of the present embodiment, the POI pushing unit 503 may be further configured to: display synchronously the relevant information of the target POI on a central control display of the vehicle.

In some alternative implementations of the present embodiment, the apparatus 500 may further include an interaction unit not shown in FIG. 5, configured to: receive, through the head up display and/or the central control display, a user operation instruction targeted at the target POI; and display, through the head up display and/or the central control display, a page corresponding to the operation instruction.

It should be understood that the units 501 to 503 recorded in the apparatus 500 for pushing information respectively correspond to the steps in the method described with reference to FIG. 2. Therefore, the operations and features described above for the method for pushing information are also applicable to the apparatus 500 and the units contained therein, and detailed description thereof will be omitted.

In the technical solution of the present disclosure, the acquisition, storage, and application of user personal information involved are in compliance with relevant laws and regulations, and does not violate public order and good customs.

According to an embodiment of the present disclosure, an electronic device, a readable storage medium, and a computer program product are provided.

Figure 6:
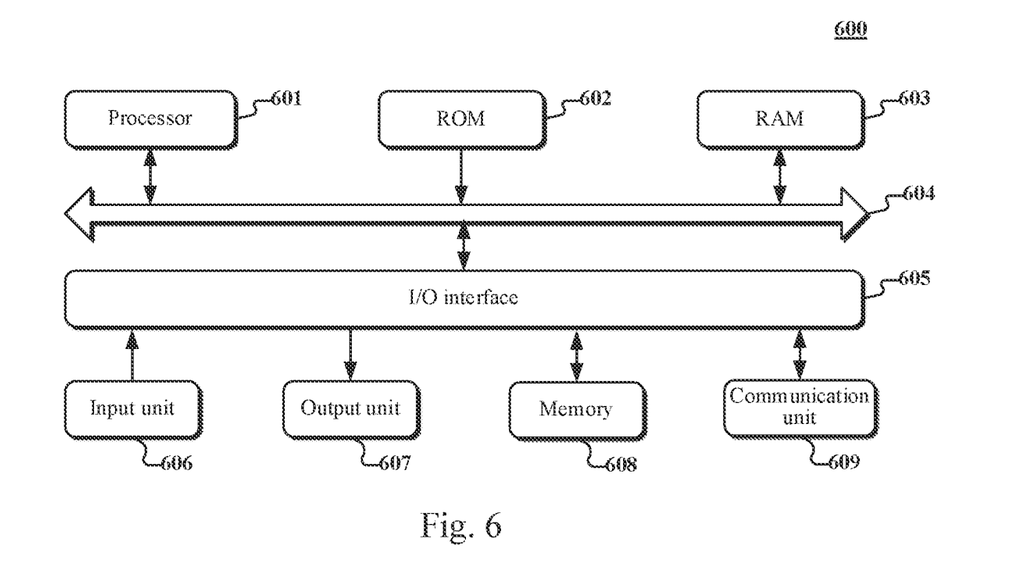
FIG. 6 is a block diagram of an electronic device used to implement the method for pushing information according to an embodiment of the present disclosure.

FIG. 6 is a block diagram of an electronic device 600 used to implement the method for pushing information according to an embodiment of the present disclosure. The electronic device is intended to represent various forms of digital computers such as a laptop computer, a desktop computer, a workstation, a personal digital assistant, a server, a blade server, a mainframe computer, and other appropriate computers. The electronic device may also represent various forms of mobile apparatuses such as personal digital processing, a cellular telephone, a smart phone, a wearable device and other similar computing apparatuses. The parts shown herein, their connections and relationships, and their functions are only as examples, and not intended to limit the implementations of the present disclosure as described and/or claimed herein.

As shown in FIG. 6, the device 600 may include a computing unit 601, which may execute various appropriate actions and processes in accordance with a computer program stored in a read-only memory (ROM) 602 or a computer program loaded into a random-access memory (RAM) 603 from a storage unit 608. The RAM 603 may alternatively store various programs and data required by operations of the device 600. The computing unit 601, the ROM 602 and the RAM 603 are connected to each other through a bus 604. An input/output (I/O) interface 605 is also connected to the bus 604.

Multiple components of the device 600 are connected to the I/O interface 605, and include: an input unit 606, such as a keyboard and a mouse; an output unit 607, such as various types of displays and a speaker; a storage unit 608, such as a magnetic disk and an optical disk; and a communication unit 609, such as a network card, a modem and a wireless communication transceiver. The communication unit 609 allows the device 600 to exchange information or data with other devices through a computer network, such as the Internet and/or various telecommunications networks.

The computing unit 601 may be various general-purpose and/or specific-purpose processing components having processing and computing capabilities. Some examples of the computing unit 601 include, but are not limited to, a central processing unit (CPU), a graphics processing unit (GPU), various specific artificial intelligence (AI) computing chips, various computing units running machine learning model algorithms, a digital signal processor (DSP), and any appropriate processor, controller, microcontroller and the like. The computing unit 601 performs various methods and processing described above, such as the method for pushing information. For example, in some embodiments, the method for pushing information may be implemented as a computer software program, which is tangibly included in a machine-readable medium, such as the storage unit 608. In some embodiments, part or all of the computer program may be loaded and/or installed on the device 600 through the ROM 602 and/or the communication unit 609. When the computer program is loaded into the RAM 603 and executed by the computing unit 601, one or more steps of the method for pushing information described above may be performed. Alternatively, in other embodiments, the computing unit 601 may be configured to perform the method for pushing information in any other appropriate manner (such as through firmware).

The various implementations of the systems and technologies described herein may be implemented in a digital electronic circuit system, an integrated circuit system, a field programmable gate array (FPGA), an application specific integrated circuit (ASIC), an application specific standard product (ASSP), a system-on-chip (SOC), a complex programmable logic device (CPLD), computer hardware, firmware, software and/or combinations thereof. The various implementations may include: being implemented in one or more computer programs, where the one or more computer programs may be executed and/or interpreted on a programmable system including at least one programmable processor, and the programmable processor may be a specific-purpose or general-purpose programmable processor, which may receive data and instructions from a storage system, at least one input device and at least one output device, and send the data and instructions to the storage system, the at least one input device and the at least one output device.

Program codes used to implement the method for pushing information in embodiments of the disclosure may be written in any combination of one or more programming languages. These program codes may be provided to a processor or controller of a general-purpose computer, specific-purpose computer or other programmable apparatus for processing information, so that the program codes, when executed by the processor or controller, cause the functions or operations specified in the flowcharts and/or block diagrams to be implemented. These program codes may be executed entirely on a machine, partly on the machine, partly on the machine as a stand-alone software package and partly on a remote machine, or entirely on the remote machine or a server.

In the context of the disclosure, the machine-readable medium may be a tangible medium that may include or store a program for use by or in connection with an instruction execution system, apparatus or device. The machine-readable medium may be a machine-readable signal medium or a machine-readable storage medium. The machine-readable medium may include, but is not limited to, an electronic, magnetic, optical, electromagnetic, infrared, or semiconductor system, apparatus or device, or any appropriate combination thereof. A more specific example of the machine-readable storage medium may include an electronic connection based on one or more lines, a portable computer disk, a hard disk, a random-access memory (RAM), a read-only memory (ROM), an erasable programmable read-only memory (EPROM or flash memory), an optical fiber, a portable compact disk read-only memory (CD-ROM), an optical storage device, a magnetic storage device, or any appropriate combination thereof.

To provide interaction with a user, the systems and technologies described herein may be implemented on a computer having: a display device (such as a CRT (cathode ray tube) or LCD (liquid crystal display) monitor) for displaying information to the user; and a keyboard and a pointing device (such as a mouse or a trackball) through which the user may provide input to the computer. Other types of devices may also be used to provide interaction with the user. For example, the feedback provided to the user may be any form of sensory feedback (such as visual feedback, auditory feedback or tactile feedback); and input from the user may be received in any form, including acoustic input, speech input or tactile input.

The systems and technologies described herein may be implemented in: a computing system including a background component (such as a data server), or a computing system including a middleware component (such as an application server), or a computing system including a front-end component (such as a user computer having a graphical user interface or a web browser through which the user may interact with the implementations of the systems and technologies described herein), or a computing system including any combination of such background component, middleware component or front-end component. The components of the systems may be interconnected by any form or medium of digital data communication (such as a communication network). Examples of the communication network include a local area network (LAN), a wide area network (WAN), and the Internet.

A computer system may include a client and a server. The client and the server are generally remote from each other, and generally interact with each other through the communication network. A relationship between the client and the server is generated by computer programs running on a corresponding computer and having a client-server relationship with each other. The server may be a cloud server, also known as cloud computing server or virtual machine, which is a host product in the cloud computing service system, to solve the defects of difficult management and weak business scalability in traditional physical host and virtual private server (VPS) services. Servers can also be divided into distributed system servers or servers combined with blockchain.

It should be appreciated that the steps of reordering, adding or deleting may be executed using the various forms shown above. For example, the steps described in embodiments of the disclosure may be executed in parallel or sequentially or in a different order, so long as the expected results of the technical solutions provided in embodiments of the disclosure may be realized, and no limitation is imposed herein.

The above specific implementations are not intended to limit the scope of the disclosure. It should be appreciated by those skilled in the art that various modifications, combinations, sub-combinations, and substitutions may be made depending on design requirements and other factors. Any modification, equivalent and modification that fall within the spirit and principles of the disclosure are intended to be included within the scope of the disclosure.

What is claimed is:

1. A method for pushing information, the method comprising:
    acquiring a current location of a vehicle;
    determining, based on the current location of the vehicle and a position of each point of interest (POI) in a preset set of points of interest (POIs), a target POI from the set of POIs; and
    pushing relevant information of the target POI to a head up display of the vehicle;
    wherein the pushing relevant information of the target POI to a head up display of the vehicle, comprises:
    converting a position of the target POI to a vehicle coordinates system, to obtain a first coordinate;
    converting the first coordinate to a head up display coordinate system, to obtain a second coordinate; and
    drawing dynamically the second coordinate on a screen of the head up display.

2. The method according to claim 1, wherein the method further comprises:
    determining, based on a first coordinate, a distance between the target POI and the vehicle; and
    generating and outputting prompt information based on the distance.

3. The method according to claim 1, wherein the determining, based on the current location and a position of each POI in a preset set of POIs, a target POI from the set of POIs, comprises:
    determining a candidate POI from the set of POIs based on a traveling state of the vehicle and the current location of the vehicle; and
    determining the target POI from the candidate POI, based on relevant information of the candidate POI.

4. The method according to claim 3, wherein the determining a candidate POI from the set of POIs based on a traveling state of the vehicle and the current location, comprises:
    in response to determining that the vehicle is not traveling, determining at least one POI located in a preset area from the set of POIs as the candidate POI, the current location of the vehicle being within the preset area.

5. The method according to claim 3, wherein the determining a candidate POI from the set of POIs based on a traveling state of the vehicle and the current location, comprises:
    in response to determining that the vehicle is traveling, determining at least one POI from the set of POIs as the candidate POI according to a road section, the vehicle being located on the road section.

6. The method according to claim 1, wherein the method further comprises:
    displaying synchronously the relevant information of the target POI on a central control display of the vehicle.

7. The method according to claim 6, wherein the method further comprises:
    receiving, through the head up display and/or the central control display, a user operation instruction targeted at the target POI; and
    displaying, through the head up display and/or the central control display, a page corresponding to the operation instruction.

8. An apparatus for pushing information, the apparatus comprising:
   at least one processor; and
   a memory storing instructions, the instructions when executed by the at least one processor, cause the at least one processor to perform operations, the operations comprising:
   acquiring a current location of a vehicle;
   determining, based on the current location of the vehicle and a position of each point of interest (POI) in a preset set of points of interest (POIs), a target POI from the set of POIs; and
   pushing relevant information of the target POI to a head up display of the vehicle;
   wherein the pushing relevant information of the target POI to a head up display of the vehicle, comprises:
   converting a position of the target POI to a vehicle coordinate system, to obtain a first coordinate;
   converting the first coordinate to a head up display coordinate system, to obtain a second coordinate; and
   drawing dynamically the second coordinate on a screen of the head up display.

9. The apparatus according to claim 8, wherein the operations further comprise:
   determining, based on a first coordinate, a distance between the target POI and the vehicle; and
   generating and outputting prompt information based on the distance.

10. The apparatus according to claim 8, wherein the determining, based on the current location and a position of each POI in a preset set of POIs, a target POI from the set of POIs, comprises:
   determining a candidate POI from the set of POIs based on a traveling state of the vehicle and the current location of the vehicle; and
   determining the target POI from the candidate POI, based on relevant information of the candidate POI.

11. The apparatus according to claim 10, wherein the determining a candidate POI from the set of POIs based on a traveling state of the vehicle and the current location, comprises:
   in response to determining that the vehicle is not traveling, determining at least one POI located in a preset area from the set of POIs as the candidate POI, the current location of the vehicle being within the preset area.

12. The apparatus according to claim 10, wherein the determining a candidate POI from the set of POIs based on a traveling state of the vehicle and the current location, comprises:
   in response to determining that the vehicle is traveling, determining at least one POI from the set of POIs as the candidate POI according to a road section, the vehicle being located on the road section.

13. The apparatus according to claim 10, wherein the operations further comprise:
   displaying synchronously the relevant information of the target POI on a central control display of the vehicle.

14. The apparatus according to claim 13, wherein the operations further comprise:
   receiving, through the head up display and/or the central control display, a user operation instruction targeted at the target POI; and
   displaying, through the head up display and/or the central control display, a page corresponding to the operation instruction.

15. A non-transitory computer readable storage medium, storing computer instructions, the computer instructions, when executed by a processor, cause the processor to perform operations, the operations comprising:
   acquiring a current location of a vehicle;
   determining, based on the current location of the vehicle and a position of each point of interest (POI) in a preset set of points of interest (POIs), a target POI from the set of POIs; and
   pushing relevant information of the target POI to a head up display of the vehicle;
   wherein the pushing relevant information of the target POI to a head up display of the vehicle, comprises:
   converting a position of the target POI to a vehicle coordinate system, to obtain a first coordinate;
   converting the first coordinate to a head up display coordinate system, to obtain a second coordinate; and
   drawing dynamically the second coordinate on a screen of the head up display.

16. The medium according to claim 15, wherein the operations further comprise:
   determining, based on a first coordinate, a distance between the target POI and the vehicle; and
   generating and outputting prompt information based on the distance.

17. The medium according to claim 15, wherein the determining, based on the current location and a position of each POI in a preset set of POIs, a target POI from the set of POIs, comprises:
   determining a candidate POI from the set of POIs based on a traveling state of the vehicle and the current location of the vehicle; and
   determining the target POI from the candidate POI, based on relevant information of the candidate POI.

* * * * *